United States Patent
Zhao et al.

(10) Patent No.: US 12,541,692 B2
(45) Date of Patent: Feb. 3, 2026

(54) INTERFERENCE-BASED METHOD FOR KNOWLEDGE GRAPH COMPLETION AND SYSTEM THEREOF

(71) Applicant: Huazhong University of Science and Technology, Wuhan (CN)

(72) Inventors: Feng Zhao, Wuhan (CN); Xiangyu Gui, Wuhan (CN); Hai Jin, Wuhan (CN); Ruilin Zhao, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 719 days.

(21) Appl. No.: 17/935,833

(22) Filed: Sep. 27, 2022

(65) Prior Publication Data
US 2023/0351213 A1    Nov. 2, 2023

(30) Foreign Application Priority Data

Apr. 29, 2022   (CN) .......................... 202210484762.8

(51) Int. Cl.
G06N 5/022   (2023.01)

(52) U.S. Cl.
CPC .................... G06N 5/022 (2013.01)

(58) Field of Classification Search
CPC ..................................................... G06N 5/022
USPC ......................................................... 706/12
See application file for complete search history.

(56) References Cited

FOREIGN PATENT DOCUMENTS

| CN | 110147450 | | 8/2019 | | |
|---|---|---|---|---|---|
| CN | 115186818 A | * | 10/2022 | ............... | G06N 5/02 |
| WO | WO-2020143319 A1 | * | 7/2020 | ............. | G06F 16/36 |

* cited by examiner

Primary Examiner — April Y Blair
(74) Attorney, Agent, or Firm — Michael Ye; Kalos Athena Wang PLLC (57) ABSTRACT

The present invention relates to an interference-based method for knowledge graph completion and system thereof, wherein the method at least comprises: when performing sampling on a knowledge graph, constructing a knowledge graph completion model; performing model training and performance evaluation on the knowledge graph completion model; and performing prediction on missing elements of incomplete triples in the knowledge graph; the knowledge graph completion model is constructed through: based on optical interference and superposition principles, constructing a score function from data of superposed luminous intensities, mirroring the triples in the knowledge graph to a process of superposition of the luminous intensities, and differentiating between positives and negatives obtained during the sampling of the knowledge graph.

10 Claims, 2 Drawing Sheets

INTERFERENCE-BASED METHOD FOR KNOWLEDGE GRAPH COMPLETION AND SYSTEM THEREOF

This application claims the benefits of the Chinese Application No. CN202210484762.8 filed Apr. 29, 2022, which is hereby incorporated by reference as if fully set forth herein.

BACKGROUND OF TIE INVENTION

1. Technical Field

The present invention relates to the technical field of knowledge graph reasoning, and more particularly to an interference-based method for knowledge graph completion and system thereof.

2. Description of Related Art

A knowledge graph provides structured representation of knowledge. By constructing relational links between entities, it organizes massive real-world knowledge. The basic unit in a knowledge graph is a triple (h, r, t), wherein h is the head entity, and t refers to the tail entity, with r as a relation existing therebetween. Such a concise way to represent knowledge can deliver a huge quantity of basic facts and knowledge in certain fields, and is important to the development of artificial intelligence.

However, based on the open-world assumption, a knowledge graph is not exhaustive, and there are always missing parts of knowledge or information, resulting in incomplete information in a knowledge graph and degraded performance in practical applications. Besides, as structurally there are numerous frequent patterns in a knowledge graph, deeper information and models may be identified by digging these patterns. For example, from the statements "Wuhan is located in Hubei," and "Hubei is located in China", it is derived that "Wuhan is located in China." Such a model of information is also applicable to other cities. Hence, by deeply digging information in a knowledge graph, missing parts of the knowledge graph can be effectively patched.

For example, China Patent Document No. CN110147450B discloses a knowledge complementing method and device for a knowledge graph, which can solve the problems that negative examples are meaningless and 1–N relation is difficult to process in the knowledge complementing process. The method comprises the following steps: determining a space vector corresponding to the entity and the relation; calculating a semantic relation according to the space vector corresponding to the entity and the relation to obtain a new relation between the entities and complete the knowledge graph; randomly generating negative examples by using a generative countermeasure network, and training a first knowledge representation model by combining the derived fact triples; carrying out concept layering on the obtained fact triples, randomly selecting entities under the same sub-concept of the fact triples to construct a negative example, and training a second knowledge representation model by combining the derived fact triples and adopting a maximum interval method; and taking the second knowledge representation model as the input of a discriminator of the first knowledge representation model, and optimizing the first knowledge representation model through a resistance generation type network to obtain a target knowledge representation model for knowledge completion. Nevertheless, the prior patent is somehow inferior in adapting symmetrical relations in knowledge graph.

In addition, on the one hand, due to the differences in the understanding of those skilled in the art; on the other hand, due to the fact that the applicant studied a large amount of literature and patents when putting the invention, but space limitations do not allow all the details and content are described in detail, however, this does not mean that the invention does not have these prior art features, on the contrary, the present invention already has all the features of the prior art, and the applicant reserves the right to add relevant prior art to the background technology.

SUMMARY OF THE INVENTION

In the prior art, distance models such as TransE are current the mainstream of representation learning related to knowledge graphs, which uses trigonometric translation for reasoning. However, the known solutions are defective in adapting symmetrical relations in knowledge graph. Rotation models, like RotatE, fit triples in a rotating way and thus overcome the defect of the foregoing problem. However, RotatE is mainly based on phase matching, and overlooks semantic differential of entities about different relations, leading to defective prediction. Moreover, negative sampling is also a determining factor for the quality of model training. In RotatE, self-adversarial sampling provides a better example of sampling, but tends to overweight the sampled false negatives, making its prediction less accurate instead.

To solve this problem and improve prediction accuracy for knowledge completion, the present invention provides an interference-based method for knowledge graph completion. The disclosed method is based on the optical interference theory, and fit entities in a knowledge graph with light sources while representing relations as a modulator, so as to obtain the modulated synthetic luminous intensity that can indicate whether a triple could be established. During modulation, relations r well consider semantic differential among entities. In addition to phase modulation, amplitude modulation is also included. Then in the process of training, Bernoulli probability distribution is introduced to limit negative sampling, thereby overcoming the defects of self-adversarial sampling. The resulting model provides good prediction results, and is useful in completing information of missing triples in a knowledge graph.

To address the shortcomings of the prior art, the present invention provides an interference-based method for knowledge graph completion, the method at least comprising: when performing sampling on a knowledge graph, constructing a knowledge graph completion model;
performing model training and performance evaluation on the knowledge graph completion model; and
performing knowledge completion by predicting missing elements of incomplete triples in the knowledge graph;
in which the knowledge graph completion model is constructed through:
based on optical interference and superposition principles, constructing a score function from data of superposed luminous intensities,
mirroring the triples in the knowledge graph to a process of superposition of the luminous intensities, and
differentiating between positives and negatives obtained during the sampling of the knowledge graph.

The present invention introduces the optical interference and superposition principles to the completion model for knowledge graphs. It uses enhancing and weakening effects from light-wave superposition of two beams of light waves having the same frequency to simulate positives and negatives extensively existing in a knowledge graph. In optical interference effects, bright fringes associated with enhanced interference and dark fringes associated with weakened interference have obviously different characteristics. Similarly, a completion model based on the effects can differentiate between positives and negatives in a knowledge graph well, and performs well in model generalization.

Preferably, the step of performing sampling on the knowledge graph at least comprises: sampling positives in the knowledge graph in batches, and
automatically generating related negatives for at least one said positive and using the related negatives as original materials for training the knowledge graph completion model.

Preferably, the step of predicting missing elements of incomplete triples in the knowledge graph at least comprises:
successively substituting all entities or relations into vacant positions for every said triple whose information is incomplete, and scoring and/or ranking the triples, thereby predicting the missing elements.

Preferably, the step of performing sampling on the knowledge graph further comprises: for the given knowledge graph $\mathcal{G}$, extracting at least one batch of positives $\mathcal{G}^+$; for every positive (h, r, t) in $\mathcal{G}^+$, based on Bernoulli distribution probability, randomly substituting its head entity h' for h or substituting its tail entity t' for t, where (h´, r, t) or (h, r, h´´) is not present in the given knowledge graph $\mathcal{G}$, and generating n negatives corresponding to the positives, so as to obtain a negative sample set $\mathcal{G}^-$.

Preferably, the Bernoulli distribution probability is obtained from an initial structure of the graph $\mathcal{G}$ through computing:

$$p = \frac{hpt}{hpt + tph}$$

where, for any said positive (h, r, t), hpt is a count of the head entities corresponding to the tail entity of the relation r in the knowledge graph $\mathcal{G}$, tph is a count of the tail entities corresponding to the head entities of the relation r, and p is probability of substituting the tail entities.

In the processing training the knowledge graph completion model, the present invention provides an adversarial negative sampling method based on Bernoulli distribution, which allows a knowledge graph completion model to automatically extract quality negatives better, thereby improving accuracy of the trained model. The knowledge graph completion system of the present invention can score triples in a knowledge graph more accurately and predict missing triples for the knowledge graph.

Preferably, the knowledge graph completion model is constructed further through: setting a count of dimensions of the entities as d, in which every said dimension represents an independent light source,
on every said dimension, modulating an amplitude of the light source, while modulating phases of the head entities, and increasing the phases of $\varphi_{r3}$, so as to obtain modulated head-entity and tail-entity light sources,
computing superposed luminous intensity of the modulated head-entity and tail-entity light sources, and using the luminous intensity to represent possibility whether a said triple could be established, and according to an equation of luminous intensity, obtaining synthetic luminous intensity as:

$$1 = A_h^2 + A_t^2 + 2 * A_h * A_t * \cos(\varphi_h + \varphi_{r3} - \varphi_t)$$

in which a score function for scoring each said triple is a sum of synthetic luminous intensity of all said dimensions:

$$f_r(h, t) = -\epsilon * \sum A_h^2 + A_t^2 - 2 * A_h * A_t * \cos(\varphi_h + \varphi_{r3} - \varphi_t);$$

where, $\epsilon$ is a fixity coefficient, $A_h$ represents amplitude of the head entity, $A_t$ represents amplitude of the tail entity, $\varphi_h$ represents phase information of the head entity, $\varphi_t$ represents phase information of the tail entity, and $\varphi_{r3}$ represents phase information added during modulation.

Preferably, the step of performing model training on the knowledge graph completion model at least comprises:
performing training based on a loss function, which is:

$$\mathcal{L} = -\log \sigma(\gamma + f_r(h, t)) - \sum_{i=1}^{n} p(h_i', r, t_i') \log \sigma(\gamma + f_r(h_i', t_i'))$$

where $\sigma$ is a sigmoid function, $\gamma$ is an interval hyperparameter, $-\log \sigma(\gamma + f_r(h, t))$ represents the loss function for the positives, and $$\sum_{i=1}^{n} p(h_i, r, t_i') \log \sigma(\gamma + f_r(h_i', t_i'))$$

represents the loss function for the sampled negatives; where the loss weight $$p(h_i', r, t_i')$$

for the negatives is:

$$p(h_i', r, t_i') = \frac{\exp \alpha f_r(h_i', t_i')}{\sum_j \exp \alpha f_r(h_j', t_j')}$$

where $\alpha$ represents a temperature hyperparameter for adversarial sampling, and $$f_r(h_i', t_i')$$

represents summed luminous intensity of the negatives;
initializing the entities and the relations, with phases distributed evenly between 0 and $2\pi$, and optimizing the loss function $\mathcal{L}$ in a manner of gradient descent, and training the parameters.

Preferably, the step of predicting missing elements of incomplete triples in the knowledge graph further comprises: based on designated requirements for reasoning, including (h, r, ?), (?, r, t) or (h, ?, t), substituting the corresponding entity or relation into "?", and computing its score function, and ranking scores in a descending order, so as to obtain prediction results of the model.

Preferably, the step of the model evaluation at least comprises:

performing the evaluation based on the performance of the knowledge graph completion model on a training dataset, so as to obtain prediction performance metrics of the model, which at least include MRR, MR, hit@1, hit@3, and hit@10;

in which, MRR represents a mean reciprocal rank, MR represents a mean rank, hit@10 represents a hit rate of the prediction correct results hitting the first ten ranks, and hit@3 represents a hit rate of the prediction correct results hitting the first three ranks.

The present invention further provides an interference-based system for knowledge graph completion, characterized in comprising at least one processor, which is configured to: when performing sampling on a knowledge graph, construct a knowledge graph completion model;

perform model training and performance evaluation on the knowledge graph completion model; and perform knowledge completion by predicting missing elements of incomplete triples in the knowledge graph;

in which the knowledge graph completion model is constructed through:

based on optical interference and superposition principles, constructing a score function from data of superposed luminous intensities, mirroring the triples in the knowledge graph to a process of superposition of the luminous intensities, and differentiating between positives and negatives obtained during the sampling of the knowledge graph.

The disclose interference-based system for knowledge graph completion introduces the optical interference and superposition principles to the completion model for knowledge graphs. It uses enhancing and weakening effects from light-wave superposition of two beams of light waves having the same frequency to simulate positives and negatives extensively existing in a knowledge graph. In optical interference effects, bright fringes associated with enhanced interference and dark fringes associated with weakened interference have obviously different characteristics. Similarly, a completion model based on the effects can differentiate between positives and negatives in a knowledge graph well, and performs well in model generalization. Additionally, in the processing training the knowledge graph completion model, the present invention further provides an adversarial negative sampling method based on Bernoulli distribution, which allows a knowledge graph completion model to automatically extract quality negatives better, thereby improving accuracy of the trained model. The knowledge graph completion system of the present invention can score triples in a knowledge graph more accurately and predict missing triples for the knowledge graph.

DETAILED DESCRIPTION OF THE INVENTION

The present invention will be further detailed below with reference to accompanying drawings.

The present invention provides an interference-based method for knowledge graph completion and a system thereof. The present invention may further provide an apparatus for knowledge graph completion, an electronic device having function of knowledge graph completion, etc.

The present invention can also provide a storage medium, which stores program information of the method for knowledge graph completion of the present invention. The storage medium is, for example, a hard disk, a chip, a magnetic disk, a RAM, an RDM, and the like.

The present invention can also provide a processor capable of running the program coding information of the method for knowledge graph completion of the present invention.

The electronic device of the present invention includes at least a processor and a storage medium, and the processor is used for running the program information of the method for knowledge graph completion stored in the storage medium.

A knowledge graph is a directed graph composed of numerous nodes and edges. Node represent entities in the real world, and edges represent various association relations between entities, wherein an entry of knowledge is generally in the form of a triple (h, r, t), indicating that there is a relation r between the head entity h and the tail entity t.

The interference principle refers to a phenomenon that when two beams of monochromatic light of the same frequency are superposed, coherency of their luminous intensity can increase or decrease, so the synthetic luminous intensity will be greater or smaller than the original luminous intensity of the two beams, and its essence is determined by wave properties of light.

The present invention further provides an interference-based system for knowledge graph completion, which comprises at least one processor. The processor is configured to execute the method for knowledge graph completion of the present invention.

The processor at least comprises a constructing unit, a training unit, an evaluating unit, and a completing unit. The constructing unit, the training unit, the evaluating unit, and the completing unit may be integrated in the same processor, or may be in the form of sub-processors connected with each other to form the knowledge graph completion system.

The processor further comprises a sampling unit. The sampling unit has a data port for collecting sample data and/or receiving sample data. The sampling unit has a data processing function so that it can preprocess the sample data. Therefore, the sampling unit may be an application-specific IC chip, a server, or a micro-processor that preloads and operates coding information which can sample positives in a knowledge graph and generate negatives.

The sampling unit processes data in a way that it samples positives in the knowledge graph in batches and, for every positive, automatically generates related negatives as the original materials for model training.

Specifically, the sampling unit and the constructing unit are in data connection through at least one data transmission port. The constructing unit and the training unit are in data connection through at least one data transmission port. The training unit and the evaluating unit are in data connection through at least one data transmission port. The evaluating unit and the completing unit are in data connection through at least one data transmission port.

The constructing unit may be an application-specific IC chip or processor capable of operating coding information for constructing the knowledge graph completion model. The constructing unit operates the knowledge graph completion model through: based on the optical interference and superposition principles, constructing a score function from data of superposed luminous intensities, mirroring the triples in the knowledge graph to a process of superposition of the luminous intensities, and differentiating between positives and negatives obtained during the sampling of the knowledge graph.

The training unit is configured to may be an application-specific IC chip or processor capable of operating coding information for model training. The model is trained through: constructing a loss function for the model, training the loss function according to every batch of positives and negatives, and training model parameters by means of gradient descent.

The evaluating unit may be an application-specific IC chip or processor capable of evaluating performance of the model on a training dataset and thereby obtaining prediction performance metrics of the model. The evaluating unit can operate the coding information of the evaluating method of the present invention.

The completing unit may be an application-specific IC chip or processor capable of predicting missing elements for incomplete triples in a knowledge graph and thereby completing the knowledge. The completing unit can operate the coding information of a completion method.

Preferably, the disclosed interference-based system for knowledge graph completion further comprises a display terminal and interaction components, for displaying the data from the sampling unit or inputting data to the sampling unit, and for showing the data stored in the constructing unit, the training unit, the evaluating unit, and the completing unit, the completion process of the knowledge graph model and/or the completion results of the knowledge graph model.

Figure 1:
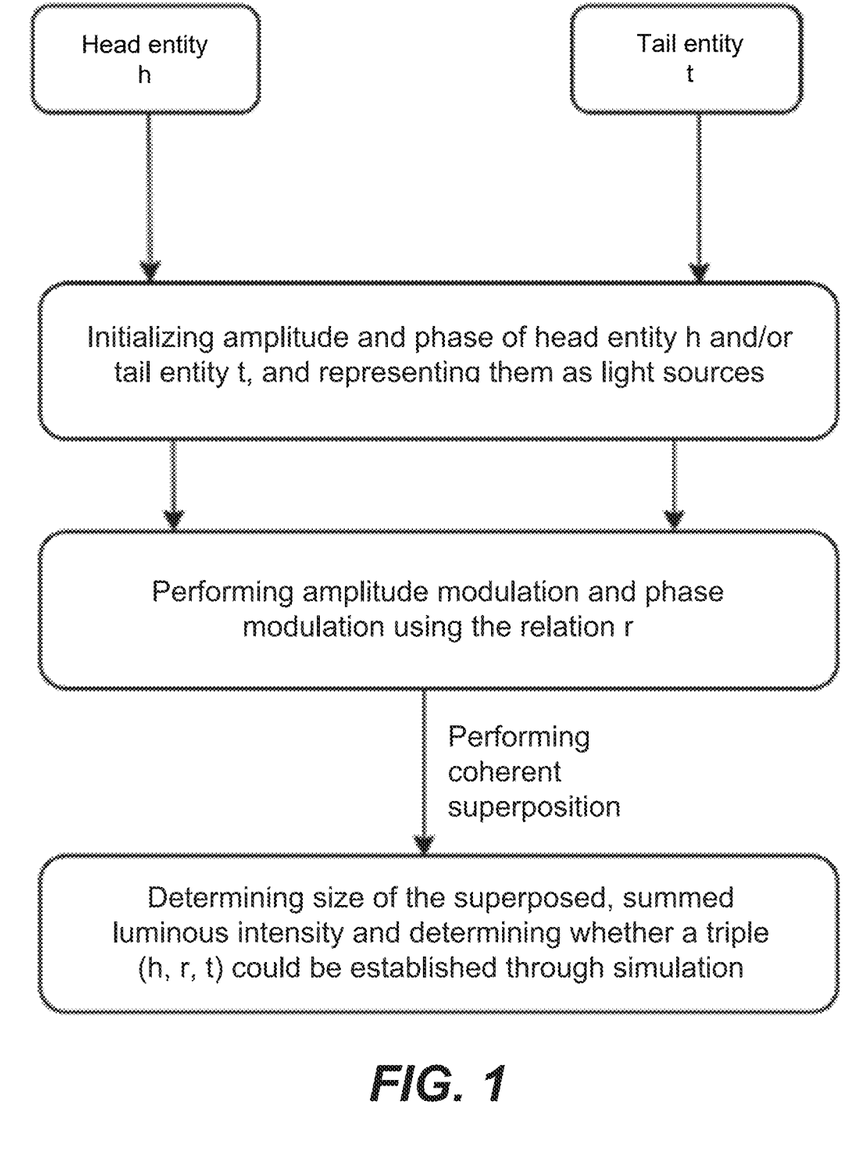
FIG. 1 is a flowchart illustrating the principle of a method for knowledge graph completion according to the present invention.

As shown in FIG. 1, the method for knowledge graph completion of the present invention is realized on the basis of the interference principle.

The method for knowledge graph completion is based on the principle as described below:
S1: initializing the amplitude and phase of the head entity h and/or the tail entity t, and representing them as light sources;
S2: performing amplitude modulation and phase modulation using the relation r;
S3: performing coherent superposition; and
S4: determining the size of the superposed, summed luminous intensity and determining whether a triple (h, r, t) could be established through simulation.

Figure 2:
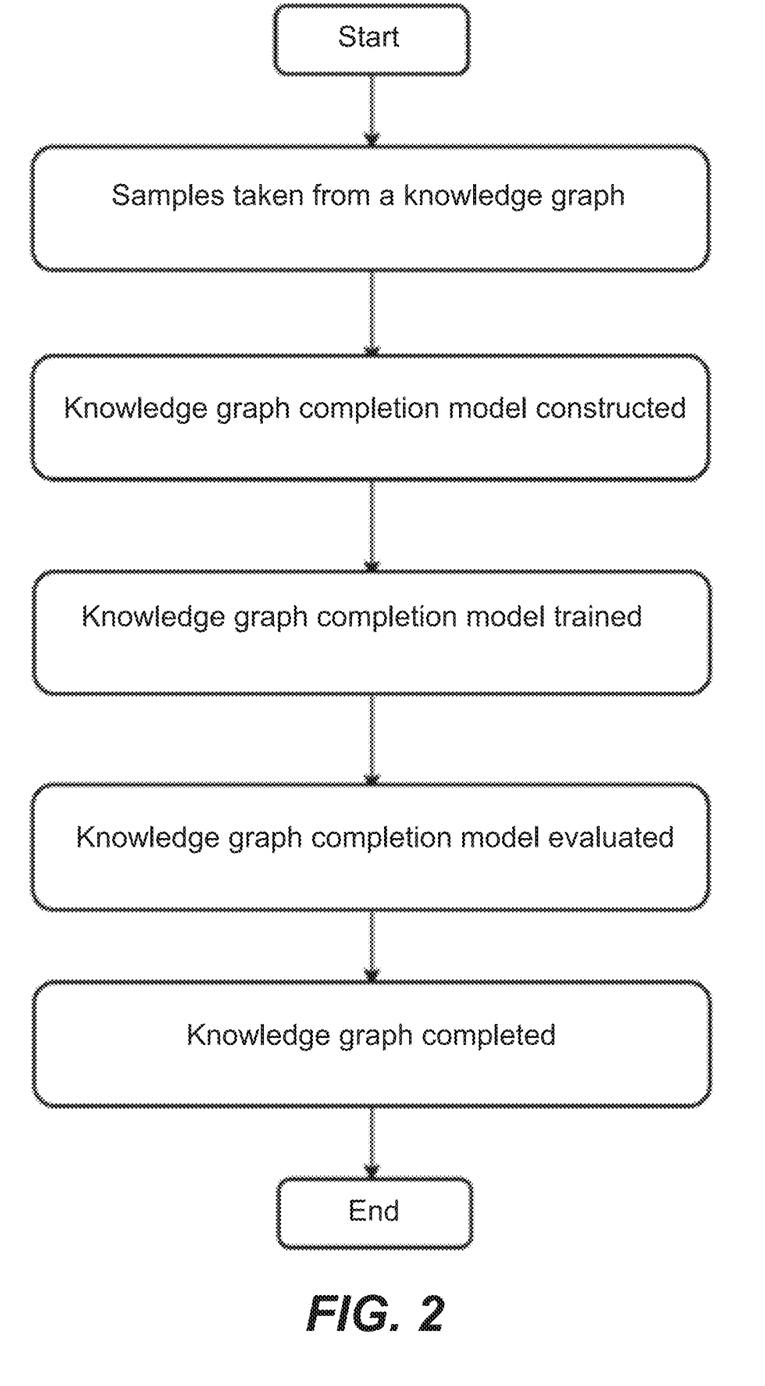
FIG. 2 is a flowchart of the method for knowledge graph completion of the present invention.

As shown in FIG. 2, the interference-based method for knowledge graph completion of the present invention at least comprises the steps detailed below.

At S11, samples are taken from a knowledge graph.

According to the given structure of the knowledge graph, a batch of positives and negatives is sampled.

Specifically, positives in the knowledge graph are sampled in batches, and related negatives for at least one said positive are automatically generated and the related negatives are used as original materials for training the knowledge graph completion model.

For the given knowledge graph $\mathcal{G}$, at least one batch of positives $\mathcal{G}^+$ are extracted.

For example, FB15k-237 is selected and used as the training dataset to extract a proper-size batch of positives $\mathcal{G}+$, wherein 1024 positives are selected for one batch.

Preferably, the size of a batch may be 512 or 1024 positives. An excessively large batch can lead to undue memory consumption and lower computing.

For every positive (h, r, t) in $\mathcal{G}^+$, based on Bernoulli distribution probability, to randomly substitute its head entity h' for h or substituting its tail entity t' for t, where (h´, r, t) or (h, r, t h´) is not present in the given knowledge graph $\mathcal{G}$, and generating n negatives corresponding to the positives, so as to obtain a negative sample set $\mathcal{G}^-$.

For every positive, 100 negatives are sampled preferably. Substitution of these samples is performed in the same way, such as substituting them for the head entity, so as to obtain a set of negatives of $(h_1´, r, t), (h_2´, r, t), \ldots, (h_{100}´, r, t)$.

For every triple (h, r, t) in the batch, hpt and tph of the relation r are counted, where for any said positive (h, r, t), hpt is a count of the head entities corresponding to the tail entity of the relation r in the knowledge graph $\mathcal{G}$, tph is a count of the tail entities corresponding to the head entities of the relation r, and p is probability of substituting the tail entities, that is the Bernoulli distribution probability.

Preferably, Bernoulli distribution probability p is computed based on the initial structure of the knowledge graph $\mathcal{G}$:

$$p = \frac{hpt}{hpt + tph}$$

and for every positive (h, r, t) in $\mathcal{G}^+$, according to the Bernoulli distribution, the probability p is used to replace the tail entity t, and the probability 1−p is used to replace the head entity h.

$$1 - p = \frac{tph}{hpt + tph}.$$

The pose-replacement (hh´, r, t) or (h, r, th´) is not present in the given knowledge graph $\mathcal{G}$. For every positive, n negatives are generated, wherein n is a fixed number, so as to obtain a negative sample set $\mathcal{G}^-$. For every positive, 100 negative samples may be selected. Substitution of these samples is performed in the same way, such as substituting them for the head entity, so as to obtain a set of negatives in the form of $$(h'_1, r, t), (h'_2, r, t), \ldots, (h'_{100}, r, t).$$

In this step of the present invention, when determining negative sampling of one-to-many or many-to-one relation, the inventor found that replacement of the entity corresponding "one" is more likely to construct correct negatives.

In one example, for a triple (Hubei, located in, China), "located in" is a many-to-one relation because many cities can be located in a certain place. Therefore, negatives constructed by substituting "Hunan" for "Hubei" are obviously not established. On the contrary, substituting another entity for "China", it is apparent that negatives can be easily satisfied.

The present invention effectively improves prediction accuracy of the knowledge graph completion model. As to either semantic differential matching between entities in relations, or negative sampling based on Bernoulli distribution, training effects and prediction accuracy of the knowledge graph completion model is improved, thereby providing more accurate results in response to estimation requests from users.

At S12, a knowledge graph completion model is constructed.

With the knowledge graph sampled, for the sampled positives and negatives, a knowledge graph completion model that can differentiate the two is constructed, and a score function is set correspondingly to mirror the triples in the knowledge graph to the process of luminous intensity superposition, so as to differentiate the sampled positives and negatives.

The knowledge graph completion model is constructed at least through:

S121: based on optical interference and superposition principles, constructing a score function from data of superposed luminous intensities;

S122: mirroring the triples in the knowledge graph to a process of superposition of the luminous intensities; and S123: differentiating between positives and negatives obtained during the sampling from the knowledge graph.

Therein, at S121-1, the count of dimension of entity is set as d, and every dimension represents an independent light source. For example, d may be set as 1000.

So, $E=\exp[i(wt+\varphi)]$.

Therein, the light source has its amplitude as 1, $\varphi$ is phase information, w is the frequency, and t is the time, wherein the frequency and the time can be ignorable.

The head entity is represented as: $E_h=\exp[i(wt+\varphi_h)]$
The tail entity is represented as: $E_t=\exp[i(wt+\varphi_t)]$ At S121-2, the relation is regarded as the modulator for the light sources that modulates amplitude of the light source in every dimension. The modulated amplitudes are:

$A_h=1+\lambda \cos(\varphi_h+\varphi_{r1})$ $A_t=1+\lambda \cos(\varphi_t+\varphi_{r2})$ Therein, $\varphi_{r1}$ provided by the relation r is used with $\varphi_h$ for modulation of the amplitude of the head entity. Based on $\varphi_{r2}$ provided by the relation r together with $\varphi_t$, modulation for the amplitude of the tail entity is performed. $\lambda$ is the correlation coefficient, whose value is in the [0,1] interval.

Meanwhile, based on the relation r, the head entity is modulated in terms of phase to increase $\varphi_{r3}$ in phase, and then the modulated head entity and tail entity light sources can be obtained.

The modulated light sources for the head entity and the tail entity are represented as:

$$M_r(E_h) = A_h^2 \exp[i(wt + \varphi_h + \varphi_{r3})]$$

$$M_r(E_t) = A_t \exp[i(wt + \varphi_t)]$$

The present invention introduces semantic differential between entities in relations. In this step, the amplitudes $A_h$ and $A_t$ of the head entity and the tail entity are both modulated by the relations. Specifically, one entity can have different amplitudes under different relations, and this corresponds to the fact that one entity may have different semantic meanings under different relations, thereby effectively representing information in the knowledge graph. At S121-3, superposed luminous intensity of the modulated head entity and tail entity light sources is computed, and the possibility whether a triple could be established is represented using luminous intensity.

With the equation for luminous intensity, the synthetic luminous intensity can be obtained as:

$$I = A_h^2 + A_t^2 + 2 * A_h * A_t * \cos(\varphi_h + \varphi_{r3} - \varphi_t).$$

In the present invention, given that $\varphi_{r3} \leftarrow \varphi_{r3}+\pi$, the luminous intensity can be written as:

$$I = A_h^2 + A_t^2 - 2 * A_h * A_t * \cos(\varphi_h + \varphi_{r3} - \varphi_t).$$

The score function for scoring every triple is the sum of the synthetic luminous intensities of all dimensions:

$$f_r(h, t) = -\epsilon * \sum A_h^2 + A_t^2 - 2 * A_h * A_t * \cos(\varphi_h + \varphi_{r3} - \varphi_t).$$

where, $\epsilon$ is the fixity coefficient, $A_h$, represents the amplitude of the head entity, $A_t$ represents the amplitude of the tail entity, $\varphi_h$ represents the phase information of the head entity, $\varphi_t$ represents the phase information of the tail entity, and $\varphi_{r3}$ represents the phase information added during modulation.

In the present invention, the score function has to be controlled in a reasonably sized interval, so as to prevent the exploding gradient problem during training. For example, the score function may have an interval of [0,24]. A triple with a higher score has its $f_r(h, t)$ closer to 0, which means a higher phase matching degree, making it more possible be a positive.

At S13, the knowledge graph completion model is trained.

A loss function is constructed to train the parameters for the knowledge graph completion model, so as to obtain a mature model with greater generalization.

The loss function and is set as:

$$\mathcal{L} = -\log \sigma(\gamma + f_r(h, t)) - \sum_{i=1}^{n} p(h_i', r, t_i') \log \sigma(\gamma + f_r(h_i', t_i'))$$

where $\sigma$ is a sigmoid function, $\gamma$ is an interval hyperparameter, $-\log \sigma(\gamma+f_r(h, t))$ represents the loss function for the positives, and $$\sum_{i=1}^{n} p(h_i', r, t_i') \log \sigma(\gamma + f_r(h_i', t_i'))$$

represents the loss function for the sampled negatives. Preferably, $\gamma$ is 9.

The loss function for positives and the loss function for negatives are trained together. Therein, for the loss of every negative, the system assigns a weight.

For example, for the $i^{th}$ negative, the loss weight $$p(h_i', r, t_i')$$

of the negative is:

$$p(h'_i, r, t'_i) = \frac{\exp \alpha f_r(h'_i, t'_i)}{\sum_j \exp \alpha f_r(h_{\cdot_j}, t_{\cdot_j})}$$

α represents the temperature hyperparameter for adversarial sampling, and $$f_r(h'_i, t'_i)$$

represents the summed luminous intensity of the negatives. Preferably, α is set as 0.5 or 1.0.

The entities and the relations are initialized with the phases evenly distributed between 0 and 2π. Then the loss function $\mathcal{L}$ is optimized by means of gradient descent for training the parameters.

The gradient descent method is used to update the trained parameters. That is, in every batch of training, the to-be-trained variable θ is updated by computing the gradient $\nabla \mathcal{L}$ $\mathcal{L}$ of the loss function.

The updating method is θ=θ−α*$\nabla \mathcal{L}$.

Therein, α is the learning rate, which can be generally set as 0.001 or 0.01. Therein, the corresponding epoch is generally set as 1000 iterations.

At S14, the knowledge graph completion model is evaluated.

The performance of the knowledge graph completion model is evaluated on the training dataset, and the prediction performance metrics of the model can be obtained.

The prediction performance metrics at least include MRR, MR, hit@1, hit@3, and hit@10. MRR represents a mean reciprocal rank, MR represents a mean rank, and hit@10 represents a hit rate of the prediction correct results hitting the first ten ranks. hit@3 and hit@1 may be deduced by analogy. The greater the metrics are, the better the prediction completion ability of the system is.

At S15, the knowledge graph is completed.

For incomplete triples in the knowledge graph, prediction of missing elements is performed.

All entities or relations are successively substituted into vacant positions for every said triple whose information is incomplete. Incomplete triples are scored and ranked, so as to achieve prediction of missing elements.

Then based on designated requirements for reasoning, (h, r, ?), (?, r, t) or (h, ?, t), the corresponding entity or relation is substituted into "?," and computing is performed for the score function.

The scores are ranked in a descending order, so as to obtain prediction results of the model.

At S16, the process ends.

According to a specific embodiment, the method disclosed in the present invention could be deployed on a NVIDIA GPU processor, such as a NVIDIA Tesla v100 GPU processor. A GPU processor deployed with the disclosed method could be applied to any application scenario based on knowledge graph, for example, e-commerce graph, finance graph and so on, which, during operation, could automatically generate missing relations in the original graph. For example, in an e-commerce knowledge graph, the production place of the entity "fridge" is "Hubei Province", "Hubei Province" belongs to "China", as model could learn great number of instances to obtain a matching rule, it could automatically deduce that the fridge is made in China, so as to complement the missing information. Its matching rule is "if A is made in B, while B is located within C, then A is made in C".

Data processed by the processor deployed with the disclosed method is triple data in the form of RDF. These data have a uniform format (h, r, t), i.e., (head entity, relation, tail entity). Such data sometimes a data from general field, collected from various cyclopedia, such as Wikipedia, or Baidu Baike. Some data are public, such as DBpedia, freebase, wikidata, and they can be freely accessed, downloaded or called. Some of these data are human-constructed special knowledge graphs, which are generally not public. The above data are stored locally, and by training these data, the model could automatically learn the rules in the data.

Simply put, data are acquired through Internet public interfaces, such as dump provided by wikidata. The acquired data are then cleaned, when they are cleaned into the form of triples, they can be used by the processor. It is also possible to download the data and store them in a hard disk, and the processor calls the data through the hard disk or other forms of storage hardware.

The processed data are called by a memory to form batch data, the batch data are sent to the GPU, so as to complete computing and training on the GPU to obtain a well learned or trained model. The trained model could perform prediction. The computing process of the prediction is also performed on the GPU. When (h, r, ?) is input into the model, the model would output t. When (h, ?, t) is input into the model, the model would predict r. When (?, r, t) is input into the model, the model would predict h. In this way, prediction of accurate tail entity, relation and head entity is completed.

After the processing ends, the result is sent to the CPU for further processing. The result could be output to a display or output as a file of batches of results (excel sheet, txt text). These results could be manually reviewed to determine whether the completion or prediction is reasonable, artificial selection can be performed at the same time. Of course, artificial selection is not necessary and it is beyond the scope of the present invention. The disclosed method or system merely provides some results of high credibility. Whether or not to adopt these results and to perform subsequent processing depends on actual needs.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents. The description of the present invention contains a number of inventive concepts, such as "preferably", "according to a preferred embodiment" or "optionally", and they all indicate that the corresponding paragraph discloses an independent idea, and the applicant reserves the right to file a divisional application based on each of the inventive concepts.

What is claimed is:

1. An interference-based method for knowledge graph completion, the method comprising the steps of:
(a) performing sampling on a knowledge graph using a processor, wherein step (a) comprises:
constructing a knowledge graph completion model by the processor, wherein the knowledge graph completion model is constructed by, based on optical interference and superposition principles, constructing a score function from data of superposed luminous intensities, mirroring the triples in the knowledge graph to a process of superposition of the luminous intensities, and differentiating between positives and negatives obtained during the sampling of the knowledge graph;
sampling positives in the knowledge graph in batches, and;
automatically generating related negatives for at least one said positive and using the related negatives as original materials for training the knowledge graph completion model;
(b) performing model training and performance evaluation on the knowledge graph completion model;
(c) performing knowledge completion by predicting missing elements of incomplete triples in the knowledge graph; and
(d) completing the knowledge graph,
wherein step (a) further comprises:
for a given knowledge graph $\mathcal{G}$, extracting at least one batch of positives $\mathcal{G}+$, for every positive (h, r, t) in $\mathcal{G}+$, based on Bernoulli distribution probability, randomly substituting its head entity h' for h or substituting its tail entity t' for t, where (h', r, t) or (h, r, t') is not present in the given knowledge graph $\mathcal{G}$, and generating n negatives corresponding to the positives, so as to obtain a negative sample set $\mathcal{G}-$,
wherein the Bernoulli distribution probability is obtained from an initial structure of the graph $\mathcal{G}$ through computing:

$$p = \frac{hpt}{hpt + tph}$$

wherein, for any said positive (h, r, t), hpt is a count of the head entities corresponding to the tail entity of the relation r in the knowledge graph $\mathcal{G}$, tph is a count of the tail entities corresponding to the head entities of the relation r, and p is probability of substituting the tail entities,
wherein the knowledge graph completion model is constructed further through: setting a count of dimensions of the entities as d, in which every said dimension represents an independent light source,
on every said dimension, modulating an amplitude of the light source, while modulating phases of the head entities, and increasing the phases of $\varphi r3$, so as to obtain modulated head-entity and tail-entity light sources,
computing superposed luminous intensity of the modulated head-entity and tail-entity light sources, and using the luminous intensity to represent possibility whether a said triple could be established, and according to an equation of luminous intensity, obtaining synthetic luminous intensity as:

$$I = A_h^2 + A_t^2 - 2 * A_h * A_t * \cos(\varphi_h + \varphi_{r3} - \varphi_t)$$

in which a score function for scoring each said triple is a sum of synthetic luminous intensity of all said dimensions:

$$f_r(h, t) = -\epsilon * \sum A_h^2 + A_t^2 - 2 * A_h * A_t * \cos(\varphi_h + \varphi_{r3} - \varphi_t);$$

wherein $\epsilon$ is a fixity coefficient, Ah represents amplitude of the head entity, At represents amplitude of the tail entity, $\varphi h$ represents phase information of the head entity, $\varphi t$ represents phase information of the tail entity, and $\varphi r3$ represents phase information added during modulation,
wherein step (b) further comprises:
performing training based on a loss function, which is:

$$\mathcal{L} = -\log \sigma(\gamma + f_r(h, t)) - \sum_{i=1}^{n} p(h_i', r, t_i')\log \sigma(\gamma + f_r(h_i', t_i'))$$

wherein $\sigma$ is a sigmoid function, $\gamma$ is an interval hyperparameter, $-\log \sigma(\gamma + f_r(h, t))$ represents the loss function for the positives, and $$\sum_{i=1}^{n} p(h_i', r, t_i')\log \sigma(\gamma + f_r(h_i', t_i'))$$

presents the loss function for the sampled negatives, wherein the loss weight $$p(h_i', r, t_i')$$

for the negatives is:

$$p(h_i', r, t_i') = \frac{\exp \alpha f_r(h_i', t_i')}{\sum_j \exp \alpha f_r(h_j', t_j')}$$

wherein $\alpha$ represents a temperature hyperparameter for adversarial sampling, and $f_r(h_i', t_i')$ represents summed luminous intensity of the negatives;
initializing the entities and the relations, with phases distributed evenly between 0 and $2\pi$,
optimizing the loss function $\mathcal{L}$ in a manner of gradient descent, and
training the parameters.

2. The interference-based method for knowledge graph completion of claim 1, wherein step (c) further comprises:
successively substituting all entities or relations into vacant positions for every said triple whose information is incomplete, and scoring or ranking the triples, thereby predicting the missing elements.

3. The interference-based method for knowledge graph completion of claim 1, wherein step (c) further comprises:
based on designated requirements for reasoning, including (h, r, ?), (?, r, t) or (h, ?, t),
substituting the corresponding entity or relation into "?", and computing its score function, and
ranking scores in a descending order, so as to obtain prediction results of the model.

4. The interference-based method for knowledge graph completion of claim 1, wherein step (b) further comprises:
performing the evaluation based on the performance of the knowledge graph completion model on a training dataset, so as to obtain prediction performance metrics of the model, which at least include MRR, MR, hit@1, hit@3, and hit@10;
wherein MRR represents a mean reciprocal rank, MR represents a mean rank, hit@10 represents a hit rate of the prediction correct results hitting the first ten ranks, and hit@3 represents a hit rate of the prediction correct results hitting the first three ranks.

5. The interference-based method for knowledge graph completion of claim 4, wherein data to be processed are acquired from Internet public interfaces, wherein processed data form batch data and are called by a memory, wherein the batch data are sent to a GPU, so as to complete computing and training on the GPU to obtain a well learned or trained model.

6. An interference-based system for knowledge graph completion, comprising at least one processor, which is configured to:
(a) perform sampling on a knowledge graph, wherein step (a) comprises:
constructing a knowledge graph completion model, wherein the knowledge graph completion model is constructed by, based on optical interference and superposition principles, constructing a score function from data of superposed luminous intensities, mirroring the triples in the knowledge graph to a process of superposition of the luminous intensities, and differentiating between positives and negatives obtained during the sampling of the knowledge graph;
sampling positives in the knowledge graph in batches; and automatically generating related negatives for at least one said positive and using the related negatives as original materials for training the knowledge graph completion model;
(b) perform model training and performance evaluation on the knowledge graph completion model;
(c) perform knowledge completion by predicting missing elements of incomplete triples in the knowledge graph; and
(d) completing the knowledge graph
wherein step (a) further comprises:
for a given knowledge graph $\mathcal{G}$, extracting at least one batch of positives $\mathcal{G}+$, for every positive (h, r, t) in $\mathcal{G}+$, based on Bernoulli distribution probability, randomly substituting its head entity h' for h or substituting its tail entity t' for t, tail entity t' for t, where (h', r, t) or (h, r, t') is not present in the given knowledge graph $\mathcal{G}$, and generating n negatives corresponding to the positives, so as to obtain a negative sample set $\mathcal{G}-$,
wherein the Bernoulli distribution probability is obtained from an initial structure of the graph $\mathcal{G}$ through computing:

$$p = \frac{hpt}{hpt + tph}$$

wherein, for any said positive (h, r, t), hpt is a count of the head entities corresponding to the tail entity of the relation r in the knowledge graph $\mathcal{G}$, tph is a count of the tail entities corresponding to the head entities of the relation r, and p is probability of substituting the tail entities,
wherein the knowledge graph completion model is constructed further through: setting a count of dimensions of the entities as d, in which every said dimension represents an independent light source, on every said dimension, modulating an amplitude of the light source, while modulating phases of the head entities, and increasing the phases of φr3, so as to obtain modulated head-entity and tail-entity light sources,
computing superposed luminous intensity of the modulated head-entity and tail-entity light sources, and using the luminous intensity to represent possibility whether a said triple could be established, and according to an equation of luminous intensity, obtaining synthetic luminous intensity as:

$$I = A_h^2 + A_t^2 - 2*A_h*A_t*\cos(\varphi_h + \varphi_{r3} - \varphi_t)$$

in which a score function for scoring each said triple is a sum of synthetic luminous intensity of all said dimensions:

$$f_r(h, t) = -\epsilon * \sum A_h^2 + A_t^2 - 2*A_h*A_t*\cos(\varphi_h + \varphi_{r3} - \varphi_t);$$

wherein ε is a fixity coefficient, Ah represents amplitude of the head entity, At represents amplitude of the tail entity, φh represents phase information of the head entity, φt represents phase information of the tail entity, and φr3 represents phase information added during modulation,
wherein step (b) further comprises:
performing training based on a loss function, which is:

$$\mathcal{L} = -\log \sigma(\gamma + f_r(h, t)) - \sum_{i=1}^{n} p(h_i', r, t_i')\log \sigma(\gamma + f_r(h_i', t_i'))$$

wherein σ is a sigmoid function, γ is an interval hyperparameter, $-\log \sigma(\gamma+f_r(h, t))$ represents the loss function for the positives, and $$\sum_{i=1}^{n} p(h_i', r, t_i')\log \sigma(\gamma + f_r(h_i', t_i'))$$

presents the loss function for the sampled negatives, wherein the loss weight $$p(h_i', r, t_i')$$

for the negatives is:

$$p(h_i', r, t_i') = \frac{\exp \alpha f_r(h_i', t_i')}{\sum_j \exp \alpha f_r(h_j', t_j')}$$

wherein α represents a temperature hyperparameter for adversarial sampling, and $f_r(h'_i, t'_i)$ represents summed luminous intensity of the negatives;
initializing the entities and the relations, with phases distributed evenly between 0 and 2π,
optimizing the loss function $\mathcal{L}$ in a manner of gradient descent, and
training the parameters.

7. The interference-based system for knowledge graph completion of claim 6, wherein step (c) further comprises:

successively substituting all entities or relations into vacant positions for every said triple whose information is incomplete, and scoring or ranking the triples, thereby predicting the missing elements.

8. The interference-based system for knowledge graph completion of claim 6, wherein step (c) further comprises: based on designated requirements for reasoning, including (h, r, ?), (?, r, t) or (h, ?, t), substituting the corresponding entity or relation into "?", and computing its score function, and ranking scores in a descending order, so as to obtain prediction results of the model.

9. The interference-based system for knowledge graph completion of claim 6, wherein step (b) comprises:
performing the evaluation based on the performance of the knowledge graph completion model on a training dataset, so as to obtain prediction performance metrics of the model,
which at least include MRR, MR, hit@1, hit@3, and hit@10; wherein MRR represents a mean reciprocal rank, MR represents a mean rank, hit@10 represents a hit rate of the prediction correct results hitting the first ten ranks, and hit@3 represents a hit rate of the prediction correct results hitting the first three ranks.

10. The interference-based system for knowledge graph completion of claim 9, wherein data to be processed are acquired from Internet public interfaces, wherein processed data form batch data and are called by a memory, and wherein the batch data are sent to a GPU, so as to complete computing and training on the GPU to obtain a well learned or trained model.

* * * * *